(12) United States Patent
Mohr et al.

(10) Patent No.: US 11,856,275 B1
(45) Date of Patent: Dec. 26, 2023

(54) VIDEO REPRODUCTION SYSTEM AND MEDIA REPRODUCTION SYSTEM AND METHOD OF SYNCHRONIZED REPRODUCING OF A VIDEO DATA STREAM OF AN AUDIO-VISUAL DATA STREAM AND COMPUTER-READABLE STORAGE MEDIUM

(71) Applicant: For Eyes UG (haftungsbeschraenkt), Hamburg (DE)

(72) Inventors: Julian Philipp Mohr, Hamburg (DE); Jefferson Raulino Scomação, Hamburg (DE); Anna Tskhovrebov, Hamburg (DE)

(73) Assignee: FOR EYES UG (HAFTUNGSBESCHRAENKT), Hamburg (DE)

( * ) Notice: Subject to any disclaimer, the term of this patent is extended or adjusted under 35 U.S.C. 154(b) by 0 days.

(21) Appl. No.: 17/968,948

(22) Filed: Oct. 19, 2022

(51) Int. Cl.
| | |
|---|---|
| *H04N 21/845* | (2011.01) |
| *H04N 21/43* | (2011.01) |
| *H04N 21/81* | (2011.01) |
| *H04N 21/218* | (2011.01) |

(52) U.S. Cl.
CPC ....... *H04N 21/8456* (2013.01); *H04N 21/218* (2013.01); *H04N 21/4307* (2013.01); *H04N 21/8106* (2013.01)

(58) Field of Classification Search
None
See application file for complete search history.

(56) References Cited

U.S. PATENT DOCUMENTS 10,178,487 B2    1/2019  Anastas

FOREIGN PATENT DOCUMENTS

EP    2 628 047 B1    7/2016

*Primary Examiner* — Omar S Parra
(74) *Attorney, Agent, or Firm* — Scully, Scott, Murphy & Presser, P.C.

(57) ABSTRACT

A video reproduction system configured to reproduce a video data stream of an audiovisual data stream. The audiovisual data stream including an audio data stream including a timecode signal and the video data stream. The video reproduction system including: a synchronization unit having a processor comprising hardware; and a plurality of head-mounted displays. The synchronization unit is configured to: receive the audio data stream from an audio data source, send the audio data stream to a sound system, convert the timecode signal of the audio data stream into a timestamp signal, and transmit the timestamp signal to the plurality of headmounted displays. The plurality of the head-mounted displays are configured to: receive the timestamp signal, reproduce the video data stream, and synchronize the reproduction of the video data stream to the audio data stream using the timestamp signal.

20 Claims, 3 Drawing Sheets

VIDEO REPRODUCTION SYSTEM AND MEDIA REPRODUCTION SYSTEM AND METHOD OF SYNCHRONIZED REPRODUCING OF A VIDEO DATA STREAM OF AN AUDIO-VISUAL DATA STREAM AND COMPUTER-READABLE STORAGE MEDIUM

BACKGROUND

Field

The present disclosure relates to a video reproduction system and more particularly to a video reproduction system configured to reproduce a video data stream of an audiovisual data stream, comprising an audio data stream including a timecode signal and the video data stream. Furthermore, the present disclosure relates to a media reproduction system and more particularly to a media reproduction system configured to reproduce an audiovisual data stream, comprising an audio data stream including a timecode signal and a video data stream. The present disclosure also relates to a method of synchronized reproducing of a video data stream of an audiovisual data stream, and more particularly to a method of synchronized reproducing of a video data stream of an audiovisual data stream comprising an audio data stream including a timecode signal and the video data stream. Furthermore, the present disclosure relates to a computer-readable storage medium and more particularly to a computer-readable storage medium comprising instructions, which, when executed by a computer, causes a media reproduction system to execute a method of synchronized reproducing of a video data stream.

Prior Art

Extended reality (XR) allows a user to experience a world other than the one we normally perceive with bare senses. Computers and wearable sensory equipment power this experience. The term XR is typically used as an umbrella term for all real-and-virtual combined environments such as augmented reality (AR), mixed reality (MR) or virtual reality (VR).

XR hardware and software applications are usually designed for a single user. Typically, video data is shown by a head-mounted display and audio data is played back via headphones. These individual headphones are either directly integrated into the head-mounted display or are connected to it. Often XR applications use binaural sound, providing the listener with a sound sensation as if being in a room with different audio sources.

The use of a head-mounted display and headphones can cause an insular experience or even cramped impression for the user of the XR device. This often leads to limiting the usage time and losing the pleasure of the user's entertainment experience.

Furthermore, the head-mounted display and the headphones require to be precisely calibrated so that both the video displayed by the head-mounted display and the audio played back by the headphones is accurately synchronized with the movement of the user's head. In some setups, the XR device has to perform continuous computational effort to (re-)calculate the suitable audio signal corresponding to the orientation of the user's head.

For synchronizing the audio and video reproduction of a single audiovisual data stream on different devices, such as a display or a screen for video and headphones or a sound system for audio, different sound analysis methods are known.

U.S. Pat. No. 10,178,487 discloses a method for binaural audio presentation. Responsive to an audio sync signal presented to a mobile device, audio information is played back from the mobile device in a manner synchronized to display of a movie on a theater screen. The audio sync signal may be a high-frequency signal emitted by a loudspeaker in the theater.

EP 2 628 047 B1 discloses another system and method for providing alternative audio to combined video and audio and in particular to films and television shows, wherein a position code is embedded in an audio signal as an audio watermark.

SUMMARY

An object is to improve the sound quality and the user experience of an XR device.

Such object can be solved by a video reproduction system configured to reproduce a video data stream of an audiovisual data stream, comprising an audio data stream including a timecode signal and the video data stream, wherein the video reproduction system comprises a synchronization unit and a plurality of headmounted displays, such as extended reality headsets, wherein the synchronization unit is configured to: receive the audio data stream from an audio data source, send the audio data stream to a sound system, convert the timecode signal of the audio data stream into a timestamp signal, transmit the timestamp signal to the plurality of head-mounted displays, a respective one of the head-mounted displays is configured to: receive the timestamp signal, reproduce the video data stream, synchronize the reproduction of the video data stream to the audio data stream using the timestamp signal.

The video reproduction system can be based on the following considerations. The reproduction, i.e., the playback, of an audiovisual data stream can be performed by two separate devices that are each best suitable for the task, e.g., one device for reproducing an audio data stream and another device for reproducing a video data stream. This gives rise to the need of synchronization of both of these devices. This can be achieved by intercepting the audio data stream by means of a synchronization unit before it is reproduced by a sound system. A digitally accessible timestamp signal can be obtained from the timecode signal contained in the audio data stream. The timestamp signal can then be transmitted to a plurality of headmounted displays that act as display devices for the video data stream, wherein the video data stream can be one component of the audiovisual data stream.

Such video reproduction system can allow a combination of a personal, i.e., single-user, head-mounted display with a sound system, e.g., a surround sound system, providing sound for multiple users at the same time. Each user can experience a full XR vision in three dimensions by a head-mounted display as well as a full range audio experience by a powerful speaker system. Despite major progress in headphone design, the sound of state-of-the-art headphones does not compare to the sound experience of a full sound system yet, e.g., full-size subwoofers reproduce bass frequencies better than headphones. In addition to this, the use of an external sound system instead of individual headphones can allow for a more open experience for the user and for a joined entertainment experience with the rest of the audience.

The audiovisual data stream can comprise an audio data stream and a video data stream, i.e., an audio component and a video component. According to an embodiment, the audiovisual data stream can be a movie or a TV program or a 360° video including sound, wherein a 360° video is a video that provides a view in all directions, but with no ability to interact with the virtual environment. In a further embodiment, the audiovisual data stream can be a live audiovisual production, such as, of a concert or of a musical or of a sports event or of an e-sports event or of an exhibition or of a conference or any type of interactive live media. In a further embodiment, the video data stream can be an XR data stream, such as, a VR data stream. In a further embodiment, the video data stream can contain three dimensional video data. In another embodiment, the audio data stream can be an analog audio data stream. In yet another embodiment, the audio data stream can be a digital audio data stream.

The audio data stream can include a timecode signal. Within the context of this specification, the term "timecode signal" refers to any timing information contained in the audio data stream. For example, the term timecode signal refers to a standard timecode used in cinema and/or TV and/or movie and/or video production. As another example, the timecode signal is a timecode according to the standard of the Society of Motion Picture and Television Engineers (SMPTE) and/or other standards, such as a MIDI standard. Using a timecode standard allows for flexible usage is of the video reproduction system. Using other timing information present in the audio data stream as timecode signal holds the advantage of the video reproduction system being independent of the incoming audio data stream.

In an embodiment, the synchronization unit can be a computer hardware device, such as, comprising a processing unit and/or analog-to-digital converters and/or digital-to-analog converters. In a further embodiment, the synchronization unit can be a single-board computer. In another embodiment, the synchronization unit can be configured to receive the audio data stream via a wired connection, such as via twisted pair cabling with a RJ45 connector and/or via a phone connector and/or via an XLR connector. Here the term "twisted pair" refers for example to a CAT5 or CAT6 cable; the term "phone connector" is also known as headphone jack, e.g., a three-contact version called tip-ring-sleeve (TRS) connector; the term "XLR" refers to electrical connectors used for professional audio, specified in the international standard IEC 61076-2-103. A wired connection allows for a stable high throughput audio data stream as input for the synchronization unit.

The synchronization unit can be configured to convert the timecode signal of the audio data stream into a timestamp signal. In an embodiment, the synchronization unit can be configured to extract the timecode signal from the audio data stream and to process the timecode signal into a timestamp signal. For example, the timestamp signal can be a digital signal. According to an embodiment, the timestamp signal can be in a format of time and in another embodiment the timestamp signal can be in a cinema-based format, e.g., including frame numbers. By using a digital timestamp signal in a format adjusted to the needs of a respective one of the head-mounted displays, it is possible to achieve an efficient and reliable synchronization of the reproduction of the audiovisual data stream.

The synchronization unit can be configured to transmit the timestamp signal to the plurality of head-mounted displays, wherein in an embodiment the synchronization unit can be configured to transmit the timestamp signal in predefined time intervals. In a further embodiment, these predefined time intervals can be regular or irregular. In a further embodiment the synchronization unit can be configured to transmit the timestamp signal to a plurality of head-mounted displays upon request of the respective one of the head-mounted displays. Transmitting the timestamp signal in predefined time intervals or transmitting the timestamp signal is upon request allows for an efficient synchronization process, adapted to the specific needs of the video reproduction system, such as, the number of head-mounted displays.

In an embodiment, the head-mounted displays can be XR headsets. In a further embodiment, the head-mounted displays can be configured to display the video data stream of an AR and/or MR and/or VR audiovisual data stream. In a further embodiment, the respective one of the head-mounted displays can be equipped with inertial measurement units for determining the orientation and/or the position of the head-mounted display in a given coordinated system. Such a given coordinate system can relate to a room, such as a cinema hall or a living room. In further embodiments, the respective one of the head-mounted displays can be equipped with additional tracking units, e.g., an eye tracing device or a head tracking device. In a further embodiment, the respective one of the head-mounted displays can be equipped with a processing unit, for example a microprocessor, for processing the timestamp signal.

In a further embodiment, a respective one of the head-mounted displays can reproduce the video data stream as monoscopic 2D, i.e., one image is directed to both eyes, or stereoscopic 3D, i.e., different images are directed to each eye. This allows for an optimized XR experience.

In a further embodiment, a respective one of the head-mounted displays can be configured to synchronize the reproduction of the video data stream to the audio data stream using the timestamp signal, wherein the respective one of the head-mounted display can be configured to display the specific part of the video data stream corresponding to the timestamp signal received from the synchronization unit. This way the respective one of the head-mounted display can be configured to reproduce the video frames of the video data stream at the same time as the corresponding audio signal of the audio data stream is reproduced.

In still another embodiment, a respective one of the head-mounted displays can be calibratable with respect to its spatial position and/or rotational orientation within a room. In a further embodiment, the video reproduction system can comprise additional sensors and/or beacons for supporting such calibration, wherein, e.g., such additional sensors can be positioned within the same room as the headmounted displays. This allows to align the orientation of the video reproduction by the head-mounted displays with the orientation of the audio data stream reproduction by the sound system, which is specifically important for XR media content.

In another embodiment, the video reproduction system can further comprise an audio data source configured to provide the audio data stream to the synchronization unit, wherein the audio data source can be configured to receive a livestream as the audio data stream and/or the audio data source can be configured to retrieve the audio data stream from a data storage, such as, configured to decode the audio data stream from Digital Cinema Package (DCP) data. This way a video reproduction system is suitable for the reproduction of a livestream and/or audiovisual data stored locally, such as, cinematic content complying with the industry standard DCP.

In another embodiment, the audio data source can be configured to decode another digital cinema data format. In another embodiment, the audio data source can be configured to provide the audio data stream without decrypting and/or decoding data. In a further embodiment, the audio data source can be configured to receive the audio data stream, such as, a live data stream, via the internet. In another embodiment, the audio data source can be configured to generate the audio data stream from an audio data memory device.

In a further embodiment, the respective one of the head-mounted displays can comprise a data storage device with video data stored thereon, wherein the respective one of the head-mounted displays can be configured to generate the video data stream from the video data stored on the data storage device. This holds the advantage of high availability of the video data stream, low energy consumption and, thus, longer battery life of the respective one of the head-mounted displays.

In a further embodiment, the video data stored on the data storage device can be the video data of a movie and/or a 360° video and or XR video data and/or other video data.

In a further embodiment, the timecode signal can be an analog signal and the timestamp signal can be a digital signal and the synchronization unit can be configured to convert the analog timecode signal into the digital timestamp signal, wherein the synchronization unit can be configured to detect errors, such as, errors concerning consistency, in the analog timecode signal and to correct the timecode signal by an error correction scheme. The video reproduction system can have high technical compatibility to existing systems. A digital signal allows for easier processing and more efficient operation. Detecting and correcting errors avoids errors in synchronization of audio data stream and video data stream due to faulty data connections.

In a further embodiment, the audio data stream can comprise at least four audio channels, such as, at least eight audio channels, or at least twelve audio channels, or at least sixteen audio channels, wherein one of said audio channels can carry the timecode signal, such as, an SMPTE timecode signal, or an SMPTE-LTC timecode signal. A LTC timecode signal is a linear timecode signal, also called longitudinal timecode signal. In another embodiment, the timecode signal can be a MIDI timecode. Multiple channels allow for a surround sound audio experience for the user with higher listening quality. Placing the timecode signal in a separate channel within the audio data stream allows for a simple detection within the audio data stream. This ensures a fast and reliable conversion into timestamp signal.

In a further embodiment. the synchronization unit can be configured to send the audio data stream in unmodified form, i.e., without making changes, to a sound system. In another embodiment, the synchronization unit can be configured to filter and/or process the audio data stream and subsequently send it to a sound system. Without making changes, the synchronization unit can be fully transparent to the audio data stream and does not interfere with the audio reproduction. By processing the audio data stream, the synchronization unit can optimize the audio data stream, e.g., adjust it to the specific needs of the sound system, the users, or the venue.

In still another embodiment, the synchronization unit can comprise a timestamp unit and a network unit, wherein the timestamp unit can be configured to receive the audio data stream, to send the audio data stream and to convert the timecode signal of the audio data stream into a timestamp signal, and the network unit can be configured to establish a wireless network connection to the respective one of the head-mounted displays and to transmit the timestamp signal from the timestamp unit to the plurality of head-mounted displays via the wireless network connection. A wireless connection supports the flexibility of the head-mounted displays. It allows for a better user experience, especially for XR or VR experiences.

In a further embodiment, the network unit can be a computer network device, such as, a wireless router or a wireless access point. In a further embodiment, the network unit can be configured to operate the wireless network connection based on Wi-Fi, such as, according to Wi-Fi 4 (IEEE 802.11n) and/or Wi-Fi 5 IEEE 802.11ac) and/or a following Wi-Fi standard.

In a further embodiment, the network unit can be configured to operate with at least 50, at least 100, or at least 150, simultaneously connected headmounted displays. In a further embodiment, the minimal range of the wireless connection from the network unit can be at least 100 meters, at least 200 meters, or at least 300 meters. These specifications allow for large audiences and large venues. In a further embodiment, the respective one of the head-mounted displays can be equipped with a wireless communication unit, wherein the wireless communication unit can be configured to receive the timestamp signal transmitted by the synchronization unit.

In still another embodiment, the respective one of the head-mounted displays can be configured to request and/or read out the timestamp signal from the synchronization unit, wherein the respective one of the head-mounted displays can be configured to request and/or read out the timestamp signal from the synchronization unit in predefined time intervals. By requesting the timestamp signal from the synchronization unit as needed, a synchronization process is efficient without push transmission from the synchronization unit being necessary.

In a further embodiment, the synchronization unit can comprise a timestamp server. The timestamp server can be configured to provide the timestamp signal for the respective one of the head-mounted displays, wherein the respective one of the head-mounted displays can be configured to request and/or read out the timestamp signal from the timestamp server.

In a further embodiment, the predefined time intervals or requesting and/or reading out the timestamp signal from the synchronization unit can be in a frequency per frame or multiple times per second or approximately once per second or once per second or once multiple seconds or more rarely. In a further embodiment, the predefined time intervals can be regular time intervals.

In a further embodiment, the synchronization unit and the respective one of the head-mounted displays can be configured to recalibrate the timestamp signal to compensate for an individual transmission latency of the timestamp signal from the synchronization unit to the respective one of the head-mounted displays, wherein the synchronization unit and the respective one of the head-mounted displays can each have an internal clock for determining a clock signal referenced to a time standard and the synchronization unit can be configured to transmit the clock signal along with the timestamp signal to the plurality of head-mounted displays and the respective one of the head-mounted displays can be configured to receive the clock signal and to determine the individual transmission latency from the clock signal and to recalibrate the timestamp signal so as to compensate for the individual transmission latency.

As a network connection between two different devices, such as, when connected via a wireless connection, shows network latency, which can vary by multiple of tens of milliseconds, it is advantageous to compensate for this transmission latency. As the transmission latency is an individual quantity for each connection between the synchronization unit and each head-mounted display, the individual transmission latency can be determined separately on each respective one of the headmounted displays. This allows for an even better synchronization of the audio data stream and the video data stream of the audiovisual data stream.

In an embodiment, an internal clock can be used for determining a clock signal referenced to a time standard. The clock signal can comprise the time, for example the local time of the synchronization unit or coordinated universal time (UTC).

In a further embodiment of the video reproduction system, the audiovisual data stream can further comprise a cinematic physical effects data stream. Here, cinematic physical effects refer to the concept of 4D film where motion pictures are combined with cinematic physical effects, such as motion, vibration, scent, rain, mist, bubbles, fog, smoke, wind, temperature changes. The physical effects are often reproduced by, e.g., specially adapted seating. In an embodiment, the video reproduction system can further comprise a cinematic physical effects unit for reproducing cinematic physical effects of the cinematic physical effects data stream, wherein the synchronization unit can be configured to transmit the timestamp signal is to the cinematic physical effects unit and the cinematic physical effects unit can be configured to receive the timestamp signal, reproduce the cinematic physical effects data stream, and synchronize reproduction of the cinematic physical effects data stream to the audio data stream using the timestamp signal.

Using the capabilities of 4D film creates for the audience a more special experience when using the video reproduction system. In a further embodiment, the cinematic physical effects data stream can be based on 4DX. Here, the term "4DX" refers to the 4D film format developed by the company CJ 4DPlex.

Such object can also be solved by a media reproduction system configured to reproduce an audiovisual data stream, comprising an audio data stream including a timecode signal and a video data stream, wherein the reproduction system comprises a video reproduction system according to one or more the above mentioned embodiments and a sound system, wherein the synchronization unit can be configured to: send the audio data stream to the sound system, the sound system can be configured to: receive the audio data stream from the synchronization unit, reproduce the audio data stream, the respective one of the head-mounted displays can be configured to: synchronize the reproduction of the video data stream to the audio reproduction of the audio data stream by the sound system using the timestamp signal.

By including the sound system into the media reproduction system, which can comprise a video reproduction system as described above, the synchronicity in the reproduction of the audiovisual data stream is further improved. In an embodiment, the sound system can be a surround sound system or a theater sound system. In a further embodiment, the synchronization unit can be configured to adjust the timestamp signal to compensate for a path latency in the audio data signal path from the synchronization unit to the reproduction by the sound system. This way, the path latency accounts for delays, e.g., in amplifiers or speakers, acquired on the audio signal's path.

In a further embodiment of the video reproduction system or the media reproduction system, a respective of the head-mounted displays can comprise a switch-off device configured to switch-off the respective one of the head-mounted displays and/or to put it into standby, wherein the switch-off device can be triggered when inactivity of the respective one of the head-mounted display's user is detected.

Such object can also solved by a method of synchronized reproducing of a video data stream of an audiovisual data stream, comprising an audio data stream including a timecode signal and the video data stream, wherein the method comprises: receiving the audio data stream by a synchronization unit, converting the timecode signal from the audio data stream into a, in particular digital, timestamp signal by the synchronization unit, transmitting the timestamp signal from the synchronization unit to a plurality of head-mounted displays, such as via a wireless network connection, sending the audio data stream from the synchronization unit to a sound system, receiving the timestamp signal by a respective one of the headmounted displays, determining synchronized video data of the video data stream for being displayed by the respective one of the head-mounted display synchronously to the audio data stream using the timestamp signal, and reproducing the synchronized video data by the respective one of the head-mounted displays.

Same or similar advantages and advantageous aspects, which have been mentioned with respect to the video reproduction system described above also apply for the method described below in a same or similar way. This explicitly includes the features of the described embodiments as well as the technical advantages resulting from the embodiments' properties.

The audiovisual data stream can comprise the audio data stream, i.e., an audio component, and the video data stream, i.e., a video component. In an embodiment, the audiovisual data stream can be a movie or a TV program or a 360° video including sound. In a further embodiment, the audiovisual data stream can be a live audiovisual production, such as, of a concert or of a musical or of a sports event or of an e-sports event or of an exhibition or of a conference or any type of interactive live media. In a further embodiment, the video data stream can be an XR data stream. In a further embodiment, the video data stream can contain three dimensional video data. In an embodiment, the audio data stream can be an analog audio data stream. In another embodiment, the audio data stream can be a digital audio data stream.

In an embodiment, the synchronization unit can be a computer hardware device, such as, comprising a processing unit and/or analog-to-digital converters and/or digital-to-analog converters. In a further embodiment, the is synchronization unit can be a single-board computer. In a further embodiment, the method comprises receiving the audio data stream via a wired connection, such as, via twisted pair cabling with a RJ45 connector and/or via a phone connector and/or via an XLR connector.

In a further embodiment, the timecode signal can be timing information contained in the audio data stream, wherein the audio data stream can be analog or digital and the timecode signal can be processed by the synchronization unit. The synchronization unit can convert the timecode signal into a timestamp signal, such as a digital timestamp signal. In a further embodiment, converting the timecode signal can comprise extracting the timecode signal from the audio data stream and processing it into a digital timestamp signal. The timestamp signal can be in a format of time or alternatively in a cinema-based format, e.g., including frame numbers.

In a further embodiment, the synchronization unit can transmit the timestamp signal to a plurality of head-mounted displays, such as, in predefined time intervals. In another embodiment, the synchronization unit can transmit the timestamp signal upon request of a respective one of the head-mounted displays. In an embodiment, the predefined time intervals can be regular time intervals.

In an embodiment for transmitting the timestamp signal from the synchronization unit to a plurality of head-mounted displays, a wireless network connection can be established. In a further embodiment, a wireless network can be established by the synchronization unit, wherein, the synchronization unit can comprise a network unit that can be a wireless router or a wireless access point. In a further embodiment, the respective one of the head-mounted displays can comprise a wireless communication unit, wherein the wireless communication unit can establish a wireless network connection and receive the timestamp signal transmitted by the synchronization unit. A wireless connection supports the flexibility of the headmounted displays and creates a better user experience.

In an embodiment, the head-mounted displays can be XR headsets, such as, AR headsets and/or MR headsets and/or VR headsets. In an embodiment, the method can comprise determining the orientation and/or the position of the respective one of the head-mounted displays in a given coordinate system, wherein the is coordinate system can relate to a room, such as a cinema hall or a living room. In a further embodiment, the method can comprise tracking the user's eyes by an eye tracking device and/or tracking the user's head by a head tracking device.

In a further embodiment, the synchronized video data can be reproduced by the respective one of the head-mounted displays using monoscopic 2D video data or stereoscopic 3D video data. Reproducing the video data can be synchronized to the timestamp signal originating from the audio data stream.

In a further embodiment, the method can comprise calibrating the spatial position and/or the rotational orientation of the respective one of the headmounted displays, such as, within a room. The sound system can be located in this room. This allows for aligning the visual orientation for the user with the audio orientation of the sound system.

In another embodiment, the method of synchronized reproducing of a video data stream can further comprise providing the audio data stream by an audio data source to the synchronization unit and further receiving a livestream as the audio data stream by the audio data source and/or retrieving the audio data stream from a data storage, such as, by decoding the audio data stream from Digital Cinema Package (DCP) data, by the audio data source.

In another embodiment, the audio data source can provide the audio data stream and decode another digital cinema data format. In another embodiment, the audio data source may not decrypt and/or decode the audio data. In a further embodiment, the audio data source can receive the audio data stream from the internet. In another embodiment, the audio data source can generate the audio data stream from an audio data memory device. With these embodiments, the method is suitable for reproducing various cinematic content complying with different industry standards.

In still another embodiment, the method of synchronized reproducing of a video data stream can comprise storing video data on a data storage device, wherein the data storage device can be part of the respective one of the headmounted displays, and generating the video data stream from the video data stored on the data storage device. In an embodiment, video data of a movie or a 360° video or alike can be stored on the video data storage device. The respective one of the is head-mounted displays can reproduce the part of the video data stream that corresponds to the timestamp signal received from the synchronization unit. This leads to a reproduction of video and audio data of the same temporal position. Storing the video data locally leads to a high availability as well as low energy consumption and therefore a longer battery life of the head-mounted displays.

In still another embodiment, the method of synchronized reproducing of a video data stream can comprise converting the timecode signal into a digital timestamp signal, wherein the audio data stream can be an analog audio data stream, wherein the method can further comprise detecting errors, such as, errors concerning consistency, in the analog timecode signal by the synchronization unit and correcting the timecode signal by an error correction scheme. Correcting errors, such as, in consistency, enhances the audio experience and the synchronization between audio data and video data. Especially when the audio data stream is analog, error correction improves the quality of the processed timecode signal as well as the timestamp signal significantly.

In a further embodiment, the synchronization unit can send the audio data stream in unmodified form, i.e., without making changes, to the sound system. In another embodiment, the synchronization unit can filter and/or process the audio data stream and send it to the sound system. This allows the synchronization unit to be either transparent by only intercepting the signal and transmitting it as is or it allows for improving the audio signal, e.g., to adjust it for specifications of the users, the venue or the speaker system.

In an embodiment, detecting errors can be checking semantically the obtained timecode signal. In a further embodiment, correcting the timecode signal can be interpolating the timecode signal.

According to a further embodiment, the audio data stream can consist of at least four audio channels, at least eight audio channels, at least twelve audio channels, at least sixteen audio channels, wherein one channel can carry the timecode signal. The timecode signal can be an SMPTE timecode signal, such as an SMPTE-LTC timecode signal. In another embodiment, the timecode signal can be a MIDI timecode. Using different channels enables a higher listening quality and a more three-dimensional sound experience as well as allows the synchronization unit to obtain the timecode signal more easily.

In still another embodiment, the method of synchronized reproducing of a video data stream can comprise requesting the timestamp signal from the synchronization unit by the respective one of the head-mounted displays, such as, in predefined time intervals. This reduces the amount of network traffic. In an embodiment, the predefined time intervals can be requests per frame or multiple times per second or approximately once per second or once every multiple seconds or more rarely. In a further embodiment, the predefined time intervals can be regular time intervals.

In a further embodiment, the synchronization unit can provide a timestamp server, wherein the timestamp server can provide the timestamp signal for the head-mounted devices. The respective one of the head-mounted displays can request and/or read out the timestamp signal from the timestamp server.

In still another embodiment, the method of synchronized reproducing of a video data stream can comprise recalibrating the timestamp signal to include a, variable, individual transmission latency of the timestamp signal from the synchronization unit to the respective one of the head-mounted displays, such as, the method further comprising determining a clock signal referenced to a time standard by an internal clock of the synchronization unit, transmitting the clock signal along with the timestamp signal from the synchronization unit to the plurality of head-mounted displays, receiving the clock signal by the respective one of the head-mounted displays, determining the individual transmission latency from the clock signal and recalibrating the timestamp signal so as to compensate for the individual transmission latency. Network connections, such as, wireless network connections, yield transmission latencies that can easily very multiple dozens of milliseconds. By recalibrating the timestamp signal to include this individual transmission latency it is ensured that the audio data stream and the video data stream are reproduced synchronously.

The clock signal determined by the synchronization unit can be referenced to a time standard, wherein the time standard can be, e.g., the local time of the synchronization unit or the UTC. In a further embodiment, the synchronization unit can transmit the clock signal together with the timestamp signal, so that the respective one of the head-mounted displays compares multiple pairs of timestamp signal and clock signal and compares these values to an internal clock of the head-mounted is display and from this determines the individual transmission latency.

In a further embodiment, the method of synchronized reproducing of a video data stream can comprise switching off the head-mounted display or putting into standby the head-mounted display, when inactivity of the user is detected by the respective one of the head-mounted displays.

In a further embodiment of the method of synchronized reproducing of a video data stream, the audiovisual data stream can further comprise a cinematic physical effects data stream. In this embodiment, the method of synchronized reproducing of a video data stream can further comprise transmitting the timestamp signal from the synchronization unit to a cinematic physical effects unit, such as, via a wireless network connection, receiving the timestamp signal by the cinematic physical effects unit, determining synchronized cinematic physical effects data of the cinematic physical effects data stream for being reproduced by the cinematic physical effects unit synchronously to the audio data stream using the timestamp signal, and reproducing the cinematic physical effects data by the cinematic physical effects unit.

Using the capabilities of 4D film creates for the audience a more special experience when using the video reproduction system. In a further embodiment, the cinematic physical effects data stream can be based on 4DX. Here, the term "4DX" refers to the 4D film format developed by the company CJ 4DPlex.

Such object can also be solved by the method of synchronized reproducing of an audiovisual data stream, comprising an audio data stream including a timecode signal and a video data stream, wherein the method comprises the method of synchronized reproducing of a video stream of an audiovisual data stream as described above and comprises sending the audio data stream from the synchronization unit to a sound system, reproducing the audio data stream by means of the sound system, determining synchronized video data of the video data stream for being displayed by the respective one of the head-mounted displays synchronously to the audio data reproduction of the sound system.

By including the sound system and reproducing the audio data stream by the sound system, both reproductions of the audiovisual stream are included in this message. By this way, the synchronization between the reproduction of both devices can even be improved.

Such object can also be solved by a computer readable storage medium comprising instructions which, when executed by computer, cause a media reproduction system to execute a method of synchronized reproducing of a video data stream or a method of synchronized reproducing of an audiovisual data stream as described above. Such a computer readable storage medium allows a media reproduction system, such as a video reproduction system or a media reproduction system as described above, to perform such a method and synchronize the reproduction of the video data stream and the audio data stream according to the invention.

BRIEF DESCRIPTION OF THE DRAWINGS

Further characteristics will become apparent from the description of the embodiments together with the claims and the included drawings. Embodiments can fulfill individual characteristics or a combination of several characteristics.

The embodiments are described below, without restricting the general intent of the invention, based on exemplary embodiments, wherein reference is made expressly to the drawings with regard to the disclosure of all details that are not explained in greater detail in the text. In the drawings.

In the drawings, the same or similar types of elements or respectively corresponding parts are provided with the same reference numbers in order to prevent the item from needing to be reintroduced.

DETAILED DESCRIPTION

Figure 1:
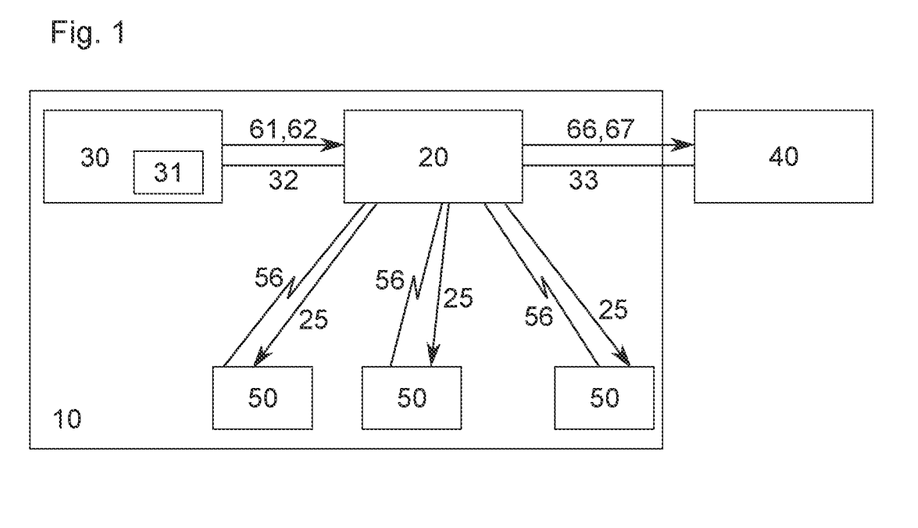
FIG. 1 is a schematic illustration of a first embodiment of a video reproduction system.

FIG. 1 schematically illustrates a video reproduction system 10 according to a first embodiment. The video reproduction system 10 includes a synchronization unit 20, which in this embodiment is a single-board computer comprising a processor and audio input and output connectors. The synchronization unit 20 receives an audio data stream 61 including a timecode signal 62 from an audio data source 30 via a wired connection 32. The audio data source provides the audio data stream 61 by decoding DCP data retrieved from the data storage 31. The wired connection 32 is a twisted pair cable and is connected to the synchronization unit 20 by a RJ45 connector. The audio data stream 61 comprises the audio signal of an audiovisual data stream, wherein the audiovisual data stream is an XR media data stream. The audio data stream 61 is an analog signal and comprises 16 channels, wherein one of the channels carries the timecode signal 62. The timecode signal 62 is a SMPTELTC timecode signal. The synchronization unit 20 sends the audio data stream 66 including the timecode signal 67 to a sound system 40 via a wired connection 33. In this embodiment, the sound system 40 is a surround sound system configured to reproduce the audio data stream 66. In this embodiment, the audio data stream 61 and the timecode signal 62 are identical to the audio data stream 66 and the timecode signal 67.

The synchronization unit 20 processes the audio data stream 61 including the timecode signal 62 and converts the analog timecode signal 62 into a digital timestamp signal 25. The synchronization unit 20 is configured to transmit the timestamp signal 25 to a plurality of head-mounted displays 50. In this embodiment, the synchronization unit 20 is configured to establish wireless network connections 56 to the plurality of head-mounted displays 50. For this, the synchronization unit 20 comprises a wireless access point. The wireless network connection 56 is based on Wi-Fi, in particular to Wi-Fi 4 using the 2.4 GHz band and Wi-Fi 5 using the 5 GHz band. The head-mounted displays 50 receive the timestamp signal 25 via the wireless network connections 56. The head-mounted displays 50 reproduce the video data stream, which is stored locally on a data storage device of the respective headmounted display 50. The head-mounted displays 50 reproduce the video data stream in synchronization with the audio data stream 61, 66 by using the timestamp signal 25. This leads for a user of a head-mounted display 50 to a synchronized experience of the video data stream displayed by the head-mounted display and the audio data stream reproduced by the sound system 40.

Figure 2:
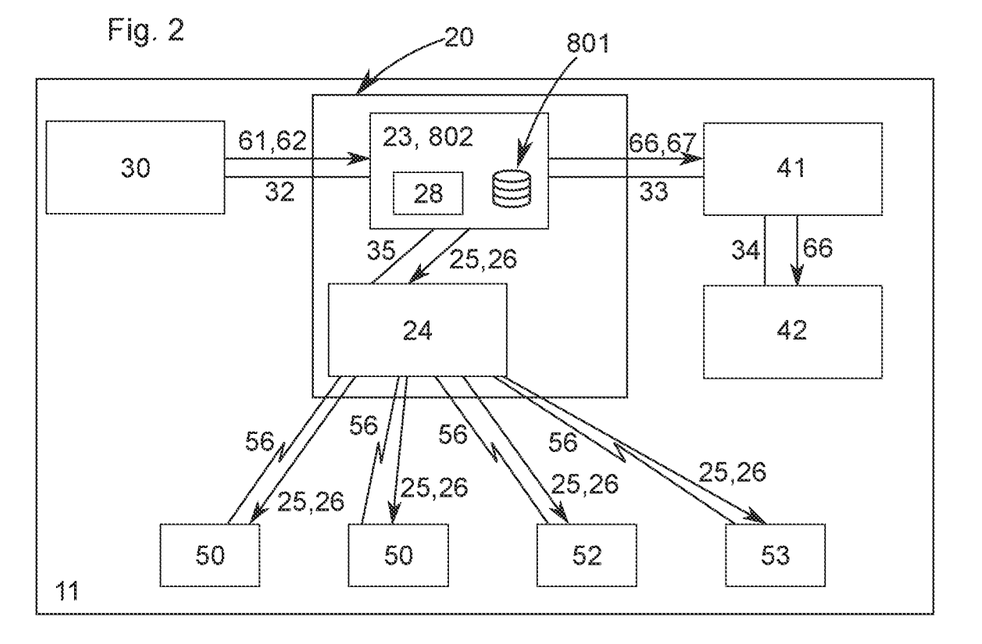
FIG. 2 is another schematic illustration of a second embodiment of a video reproduction system.

FIG. 2 schematically illustrates an embodiment of a media reproduction system 11. The overall structure of the embodiment shown in FIG. 2 is similar to the embodiment of a video reproduction system 10 depicted in FIG. 1. Here, the synchronization unit 20 is divided into a timestamp unit 23 and a network unit 24. The timestamp unit 23 is a small form factor computer 802. The computer 802 is equipped with a computer-readable storage medium 801 comprising instructions which, when executed by the computer 802, cause the media reproduction system 11 to execute a method of synchronized reproducing of a video data stream as described above. The network unit 24 is a wireless router. The timestamp unit 23 receives the audio data stream 61 including the timecode signal 62 via a wired connection 32 from the audio data source 30. The audio data stream 61 is analog and the timecode signal 62 is an SMPTE-LTC timecode signal. In this embodiment, the audio data source 30 is configured to receive the audio data stream 61 via the internet and to provide the audio data stream 61 without decrypting the audio data. The wired connection 32 is connected via phone connectors to the audio data source 30 and the timestamp unit 23. The timestamp unit 23 sends the audio data stream 66 including the timecode signal 67 to an audio interface 41 via the wired connection 33. Via the wired connection 34, the audio interface 41 sends the audio data stream 66 to the sound system 42, which reproduces the audio data stream 66. In this embodiment, the audio interface 41 comprises connectors for the input of an audio data stream 66 as well as amplifiers for reproducing the audio data stream 66. In another embodiment, which is not shown here, the sound system 40, 42 comprises the audio interface 41.

The timestamp unit 23 converts the audio data stream 61 including the analog timecode signal 62 into a digital timestamp signal 25. Furthermore, the timestamp unit 23 comprises an internal clock and determines a clock signal 26 by the internal clock 28. The timestamp unit 23 transmits the clock signal 26 along with a timestamp signal 25 to the network unit 24 via a wired connection 35, wherein the wired connection 35 is a twisted pair cable with RJ45 connectors. The network unit 24 established wireless network connections 56 with a plurality of head-mounted displays 50, 52, 53. The wireless network connection is a Wi-Fi 5 connection. In this embodiment, different types of head-mounted displays 50, 52, 53 are used. In this embodiment, by way of example and not limiting other embodiments, the headmounted displays 50 are VR headsets, the head-mounted display 52 is an MR headset and the head-mounted display 53 is an AR headset. The network unit 24 transmits the timestamp signal 25 together with the clock signal 26 to a plurality of headmounted displays 50, 52, 53 via the wireless network connections 56.

Each of the head-mounted displays 50, 52, 53 are configured to receive the clock signal 26 and to determine the individual transmission latency from the clock signal 26. The individual transmission latency depends, at least partly, on the stability of the wireless network connections 56 and the distance between the network unit 24 and the head-mounted displays 50, 52, 53 and therefore varies over time and varies from head-mounted display 50, 52, 53 to head-mounted display 50, 52, 53. Using the individual transmission latency, the different head-mounted displays 50, 52, 53 recalibrate the timestamp signal 25 so as to compensate for the individual transmission latency between the timestamp unit 23 and the head-mounted displays 50, 52, 53.

Figure 3:
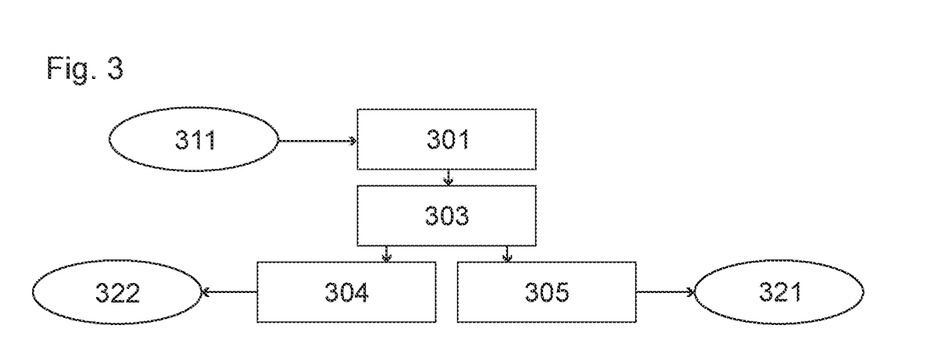
FIG. 3 illustrates a flow chart of steps performed by the synchronization unit in a first embodiment of a method of synchronized reproducing of a video data stream of an audiovisual data stream.

FIG. 3 shows a flow chart of steps performed by the synchronization unit 20 in a first embodiment of a method of synchronized reproducing of a video data stream of an audiovisual data stream. The synchronization unit 20 is receiving 301 the audio data stream, wherein the audio data stream 311 is provided by an audio data source 30. The audio data source 30 decodes DCP data to provide the audio data stream 311, which is an analog audio data stream 311. In a next step, the synchronization unit 20 is converting 303 the timecode signal into a digital timestamp signal. In this embodiment, the synchronization unit 20 only intercepts and does not modify the audio data stream 311. In the next steps, the synchronization unit 20 is sending 305 the audio data stream 311 to the sound system, wherein the sound system performs the audio reproduction 321. Also, the synchronization unit 20 is transmitting 304 the timestamp signal 322, so that the timestamp signal 322 is provided to a plurality of head-mounted displays 50, 52, 53.

Figure 4:
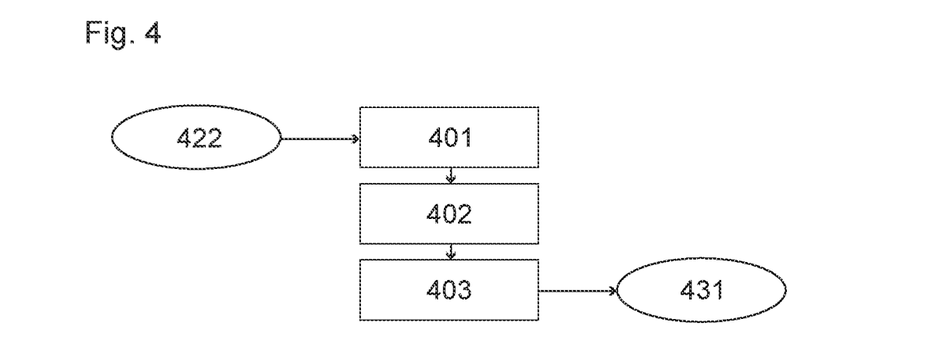
FIG. 4 illustrates another flow chart of steps performed by the respective one of the head-mounted displays in a first embodiment of a method of synchronized reproducing of a video data stream of an audiovisual data stream.

FIG. 4 shows a flow chart of steps performed by the respective one of the head-mounted displays 50, 52, 53 in a first embodiment of a method of synchronized reproducing of a video data stream of an audiovisual data stream. The timestamp signal 422 is received by a respective one of the head-mounted displays 50, 52, 53, which is processing 401 the timestamp signal. The respective one of the head-mounted displays 50, 52, 53 determines 402 the synchronized video data of the video stream. In this embodiment, this includes generating the video data stream from video data stored on a data storage device which is part of the respective one of the head-mounted displays 50, 52, 53. In the next step, the respective one of the head-mounted displays 50, 52, 53 reproduces 403 the synchronized video data, i.e., it displays the video temporally aligned with the audio data. This leads to a synchronized video reproduction 431 which runs synchronously to the audio stream data which is reproduced in the audio reproduction 321.

In an alternative embodiment, which is not depicted in FIG. 4, before the step of processing 401, the respective one of head-mounted displays 50, 52, 53 requests the timestamp signal 422 from the synchronization unit 20. This request is sent regularly in predefined time intervals, wherein in this embodiment, the predefined time intervals are once every multiple seconds. Upon this request, the timestamp signal 422 is transmitted from the synchronization unit 20 to the respective one of the head-mounted displays 50, 52, 53, which has sent the request. Then, the step of processing 401 and the consecutive steps are executed as shown in FIG. 4.

Figure 5A:
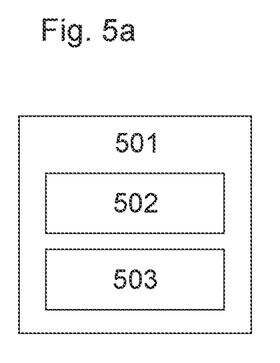
FIG. 5a is a schematic illustration of a first embodiment of an audiovisual data stream.

FIG. 5a is a schematic illustration of a first embodiment of the audiovisual data stream 501. The audiovisual data stream 501 comprises a video data stream 502 and an audio data stream 503.

Figure 5B:
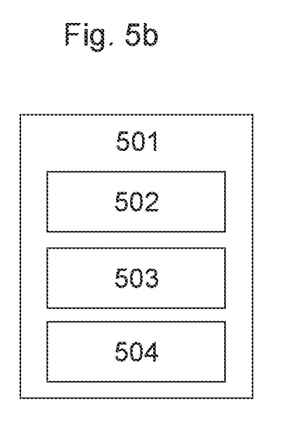
FIG. 5b is a schematic illustration of a second embodiment of an audiovisual data stream.

FIG. 5b is a schematic illustration of a second embodiment of an audiovisual data stream 501. In this embodiment, the audiovisual data stream 501 comprises a video data stream 502, an audio data stream 503 as well as a cinematic physical effects data stream 504. The cinematic physical effects data stream 504 contains information when to execute cinematic physical effects, wherein the reproduction of cinematic physical effects is adapted to the audio and video component of the audiovisual data stream.

Figure 6:
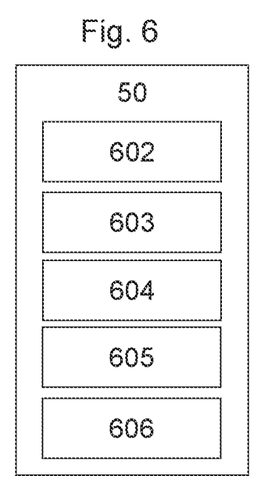
FIG. 6 is a schematic illustration of a head-mounted device.

FIG. 6 shows a schematic illustration of a further embodiment of a head-mounted device 50. The head-mounted device 50 comprises a data storage device 602, an inertial measurement unit 603, a screen 604, a wireless communication unit 605 and an internal clock 606. The screen 604 is used as a display for the reproduction of the video data stream 502. The internal clock 606 is used for determining a clock signal referenced to a time standard.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCES

10 Video reproduction system
11 Media reproduction system
20 Synchronization unit
23 Timestamp unit
24 Network unit
25 Timestamp signal
26 Clock signal
28 Internal clock
30 Audio data source
31 Data storage
32, 33, 34, 35 Wired connection
40 Sound system
41 Audio interface
42 Sound system
50 VR Headset
52 MR Headset
53 AR headset
56 Wireless network connection
61 Audio data stream
62 Timecode signal
66 Audio data stream
67 Timecode signal
301 receiving the audio data stream
303 converting the timecode signal into a timestamp signal
304 transmitting the timestamp signal
305 sending the audio data stream to a sound system
311 audio data stream
321 audio reproduction
322 timestamp signal
401 processing the timestamp signal
402 determining synchronized video data of the video data stream
403 reproducing the synchronized video data
422 timestamp signal
431 synchronized video reproduction
501 Audiovisual data stream
502 Video data stream
503 Audio data stream
504 Cinematic physical effects data stream
602 Data storage device
603 Inertial measurement unit
604 Screen
605 Wireless communication unit
606 Internal clock
801 Computer-readable storage medium
802 Computer

What is claimed is:

1. A video reproduction system configured to reproduce a video data stream of an audiovisual data stream, the audiovisual data stream comprising an audio data stream including a timecode signal and the video data stream, the video reproduction system comprising:
a synchronization unit having a processor comprising hardware; and
a plurality of head-mounted displays,
wherein the synchronization unit is configured to:
receive the audio data stream from an audio data source,
send the audio data stream to a sound system,
convert the timecode signal of the audio data stream into a timestamp signal, and
transmit the timestamp signal to the plurality of head-mounted displays, and
the plurality of the head-mounted displays are configured to:
receive the timestamp signal,
reproduce the video data stream, and
synchronize the reproduction of the video data stream to the audio data stream using the timestamp signal.

2. The video reproduction system according to claim 1, further comprising an audio data source configured to provide the audio data stream to the synchronization unit, wherein the audio data source is configured to one or more of receive a livestream as the audio data stream and retrieve the audio data stream from a data storage.

3. The video reproduction system according to claim 1, wherein the plurality of the head-mounted displays comprises a data storage device with video data stored thereon, wherein the plurality of the head-mounted displays are configured to generate the video data stream from the video data stored on the data storage device.

4. The video reproduction system according to claim 1, wherein the timecode signal is an analog signal and the timestamp signal is a digital signal and the synchronization unit is configured to convert the analog timecode signal into the digital timestamp signal.

5. The video reproduction system according to claim 1, wherein the synchronization unit further comprises a timestamp unit and a network unit, wherein the timestamp unit is configured to receive the audio data stream, to send the audio data stream and to convert the timecode signal of the audio data stream into the timestamp signal, and the network unit is configured to establish a wireless network connection to the plurality of head-mounted displays and to transmit the timestamp signal from the timestamp unit to the plurality of headmounted displays via the wireless network connection.

6. The video reproduction system according to claim 1, wherein the plurality of head-mounted displays are configured to one or more of request and read out the timestamp signal from the synchronization unit.

7. The video reproduction system according to claim 6, wherein the plurality of head-mounted displays is configured to one or more request and read out the timestamp signal from the synchronization unit in predefined time intervals.

8. The video reproduction system according to claim 1, wherein the synchronization unit and the plurality of head-mounted displays are configured to recalibrate the timestamp signal to compensate for an individual transmission latency of the timestamp signal from the synchronization unit to the plurality of head-mounted displays.

9. The video reproduction system according to claim 8, wherein the synchronization unit and the plurality of head-mounted displays each have an internal clock for determining a clock signal referenced to a time standard and the synchronization unit is configured to transmit the clock signal along with the timestamp signal to the plurality of head-mounted displays and the plurality of headmounted displays are configured to receive the clock signal and to determine the individual transmission latency from the clock signal and to recalibrate the timestamp signal so as to compensate for the individual transmission latency.

10. A media reproduction system configured to reproduce an audiovisual data stream, the audiovisual data stream comprising an audio data stream including a timecode signal and a video data stream, the media reproduction system comprising:
a video reproduction system according to claim 1; and
a sound system,
wherein the synchronization unit is configured to send the audio data stream to the sound system,
the sound system is configured to:
receive the audio data stream from the synchronization unit, and
reproduce the audio data stream, and
the plurality of head-mounted displays is configured to synchronize the reproduction of the video data stream to the audio reproduction of the audio data stream by the sound system using the timestamp signal.

11. A method of synchronized reproducing of a video data stream of an audiovisual data stream, the audiovisual data stream comprising an audio data stream including a timecode signal and the video data stream, the method comprising:
receiving the audio data stream by a synchronization unit,
converting the timecode signal from the audio data stream into a timestamp signal by the synchronization unit,
transmitting the timestamp signal from the synchronization unit to a plurality of head-mounted displays,
sending the audio data stream from the synchronization unit to a sound system,
receiving the timestamp signal by the plurality of head-mounted displays,
determining synchronized video data of the video data stream for being displayed by the plurality of headmounted display synchronously to the audio data stream using the timestamp signal, and
reproducing the synchronized video data by the plurality of headmounted displays.

12. The method of synchronized reproducing of a video data stream according to claim 11, wherein the transmitting of the timestamp signal from the synchronization unit to the plurality of head-mounted displays comprises wirelessly transmitting of the timestamp signal from the synchronization unit to the plurality of head-mounted displays via a wireless network connection.

13. The method of synchronized reproducing of a video data stream according to claim 11, further comprising providing the audio data stream by an audio data source to the synchronization unit and further one or more of receiving a livestream as the audio data stream by the audio data source and retrieving the audio data stream from a data storage by the audio data source.

14. The method of synchronized reproducing of a video data stream according to claim 11, further comprising storing video data on a data storage device, wherein the data storage device is part of the plurality of head-mounted displays, and generating the video data stream from the video data stored on the data storage device.

15. The method of synchronized reproducing of a video data stream according to claim 11, further comprising converting the timecode signal into a digital timestamp signal, wherein the audio data stream is an analog audio data stream.

16. The method of synchronized reproducing of a video data stream according to claim 11, further comprising, requesting the timestamp signal from the synchronization unit by the plurality of head-mounted displays.

17. The method of synchronized reproducing of a video data stream according to claim 16, wherein the requesting of the timestamp signal from the synchronization unit by the plurality of head-mounted displays is performed at predefined time intervals.

18. The method of synchronized reproducing of a video data stream according to claim 11, further comprising recalibrating the timestamp signal to include an individual transmission latency of the timestamp signal from the synchronization unit to the plurality of head-mounted displays.

19. The method of synchronized reproducing of a video data stream according to claim 18, wherein the method further comprising determining a clock signal referenced to a time standard by an internal clock of the synchronization unit, transmitting the clock signal along with the timestamp signal from the synchronization unit to the plurality of head-mounted displays, receiving the clock signal by the respective one of the head-mounted displays, determining the individual transmission latency from the clock signal and recalibrating the timestamp signal so as to compensate for the individual transmission latency.

20. A non-transitory computer-readable storage medium comprising instructions, which, when executed by a computer, causes a media reproduction system to at least perform the method of synchronized reproducing of a video data stream according to claim 11.

* * * * *